United States Patent
Fenne

(12) 
(10) Patent No.: US 7,050,492 B1
(45) Date of Patent: May 23, 2006

(54) MATCHING OF A REDUCED SPECTRUM LIGHTING SOURCE WITH VIDEO ENCODING PROGRAM VARIABLES FOR INCREASED DATA COMPRESSION RATIOS

(75) Inventor: Adam Michael Fenne, San Juan Capistrano, CA (US)

(73) Assignee: Pixelon.com, Inc., North Hollywood, CA (US)

(*) Notice: Subject to any disclaimer, the term of this patent is extended or adjusted under 35 U.S.C. 154(b) by 0 days.

(21) Appl. No.: 09/428,395

(22) Filed: Oct. 28, 1999

Related U.S. Application Data

(63) Continuation-in-part of application No. 09/351,028, filed on Jul. 12, 1999.

(51) Int. Cl.
*H04N 7/26* (2006.01)

(52) U.S. Cl. ........................................ 375/240; 704/501
(58) Field of Classification Search ................ 375/240; 348/642, 649, 711, 713; 380/210; 704/225, 704/226, 501, 205; H04N 7/26
See application file for complete search history.

(56) References Cited

U.S. PATENT DOCUMENTS

| | | | | |
|---|---|---|---|---|
| 2,343,971 A | * | 3/1944 | Goldsmith | 348/370 |
| 3,013,114 A | * | 12/1961 | Bridges | 348/834 |
| 4,878,113 A | * | 10/1989 | Nakamura | 348/71 |
| 5,294,974 A | * | 3/1994 | Naimpally | 348/395.1 |

* cited by examiner

*Primary Examiner*—Nhon Diep
(74) *Attorney, Agent, or Firm*—Howrey LLP

(57) ABSTRACT

A tri-phosphor light having a reduced emission spectrum is matched with program encoding variables for a video encoder, such that the video encoder substantially encodes only those portions of the visible spectrum corresponding to wavelength bands centered around intensity peaks of the light's output, and substantially does not encode wavelengths which fall above or below the high-wavelength and low-wavelength peaks, respectively, of the light's spectral output.

13 Claims, 6 Drawing Sheets

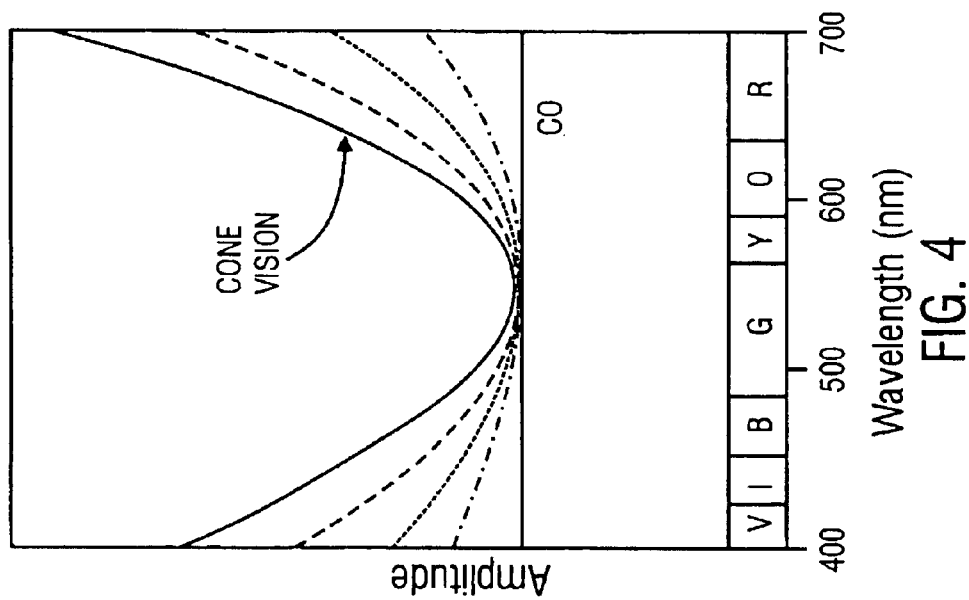

US 7,050,492 B1

MATCHING OF A REDUCED SPECTRUM LIGHTING SOURCE WITH VIDEO ENCODING PROGRAM VARIABLES FOR INCREASED DATA COMPRESSION RATIOS

RELATED APPLICATIONS

This application is a continuation-in-part of U.S. application Ser. No. 09/351,028, filed Jul. 12, 1999.

BACKGROUND OF THE INVENTION

1. Field of the Invention

This invention relates to video signal encoding, and more particularly to the field of matching of a reduced spectrum lighting source with video encoding program variables for increased data compression variables.

2. Background of the Invention

Digital storage and/or transmission of video data has applications in entertainment, video conferencing, education, medicine, and virtually any application where moving pictures are desired. High quality video data requires large bandwidths whether the video data is to be stored, or transmitted over finite bandwidth transmission media such as modems and various other Internet connections. Various algorithms and systems exist for encoding and compressing video data, including the audio data that is normally included within the video data. One such standard is the Motion Pictures Expert Group (MPEG) standard, ISO/IEC 11172, entitled "Coding of Moving Pictures and Associated Audio For Digital Storage Media At Up To About 1.5 Mbit/s", which is referred to as MPEG-1 and is incorporated herein by reference. However, 1.5 Mbit/s is too high a digital data rate to enable real time video playback over Internet connections, even including digital subscriber line (DSL) connections. Accordingly, a need exists for improved techniques for compressing, encoding, and playing back sensory stimulus data streams such as video data streams, audio data streams, and combined video/audio data streams.

SUMMARY OF THE INVENTION

In the invention, frequency information is selectively removed from a video signal. The removal of the frequency information includes reducing the magnitude of certain frequencies to zero. This magnitude reduction process can be thought of as color "raking." The color raking is performed periodically in the frequency spectrum. After the video signal has been raked, the signal is digitized and then oversaturated, which is the shifting of certain color values to nearby color values. The oversaturation process can be thought of as color rounding. Color rounding decreases the cardinal number of color values within the video signal. Both the color raking and the color rounding is performed in portions of the visible spectrum in which the human eye will not noticeably perceive that video information has been lost, i.e., the image quality will not be visibly degraded. Because raking and rounding both reduce the number of color values that a video data compressor must field as part of its color palette, the computational load on the video compressor is reduced. Additionally, the bit rate required to support video image transmission and/or reproduction is also reduced. That is, the compression ratios are increased. The invention therefore takes advantage of strengths and weaknesses in the ability of the rods and cones within the human eye to perceive colors of varying magnitudes and wavelengths.

The present invention also includes matching of a reduced spectrum lighting source with a reduced color palette within the data compressor. The use of the reduced spectrum lighting source allows the size of the color palette to be reduced without visible degradation in image quality, thus further enhancing the compression ratios.

A still further aspect of the present invention involves a method of spectral emphasis, or reverse spectral compensation, of a video signal such that when the video signal is reproduced on a playback device such as a computer monitor, the color contrast as seen by an observer of the original scene is preserved. This makes the scene as played back appear more natural looking and easier on the eye. This aspect of the invention can be explained as follows. Playback devices including television sets generally reproduce video signals with lower intensity levels than the original scene. In general, computer monitors reproduce video signals with intensity levels that are lower still. As the illumination or reproduction intensity level of a scene decreases, the eye's ability to discern color contrasts within that scene decreases. If the scene is to be reproduced on a device such as a computer monitor, without any compensation the scene would appear darker than the original scene. The effect on the human eye is similar to watching a scene at dusk rather than in full daylight. Rather than merely appearing as a lower intensity version of the same scene with all of the same color information, nuances between colors get lost. This decreasing ability to distinguish between colors as light intensity decreases will be termed "color depletion". Because the rods and cones within the human eye respond greatest at the middle of the visible light spectrum and respond less at the higher and lower ends of the spectrum, color depletion is most pronounced at the lower and higher ends of the spectrum, and is less pronounced in the middle, or generally green, part of the spectrum. Color nuances can be significantly restored by performing a spectral emphasis that is the reverse response of the human eye's photopic response. By increasing the intensity levels of the colors on the lower and the higher ends of the spectrum where the color depletion effect is most pronounced, color nuances are greatly restored from the standpoint of the human observer. In this aspect therefore the present invention includes filtering the video signal with a filter whose frequency response is generally the reverse of the human eye's spectral response to the output of a video playback device such as a computer monitor. The result is that to the human observer, the scene on the computer monitor appears to be merely a lower intensity version of the original scene with much of the color nuances remaining, rather than a dim-light, color depleted version of the original scene whose color nuances have been lost.

The above-described features and other features and benefits of the present invention will become clear to those skilled in the art when read in conjunction with the following detailed description of a preferred illustrative embodiment and viewed in conjunction with the attached drawings and appended claims.

BRIEF DESCRIPTION OF THE DRAWINGS

FIG. 4 is a graph showing the reverse spectral response compensation curve of the present invention, for display devices of various luminances.

DETAILED DESCRIPTION OF AN ILLUSTRATIVE EMBODIMENT

Figure 1:
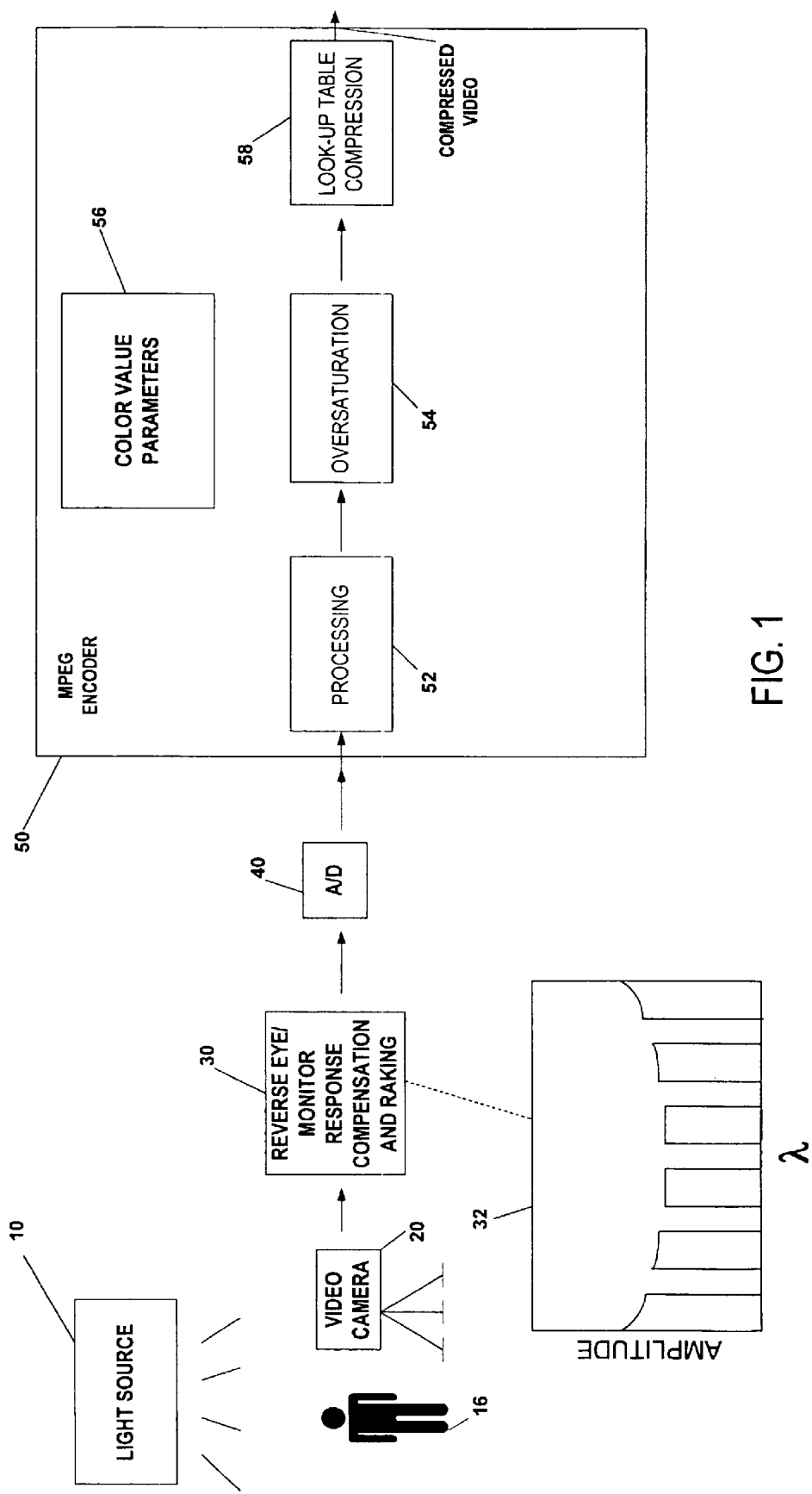
FIG. 1 is an overall block diagram of the present invention.

In the foregoing description and in the drawings, different filters will be discussed. It is to be understood that the distinction between filters is conceptual. Physically, filters can be constructed as combined or separate filters, using either analog or digital or even optical techniques, according to well known design considerations and options. It is also to be understood that the order of filters applied to a signal generally does not matter. Therefore, in the specification and claims that follow it is to be understood that different filters refer to different filter functions, rather than to physically or structurally distinct filters or to filters in any particular order. Additionally, the terms "wavelength" and "frequency" may be used interchangeably for convenience of discussion.

Figure 3B:
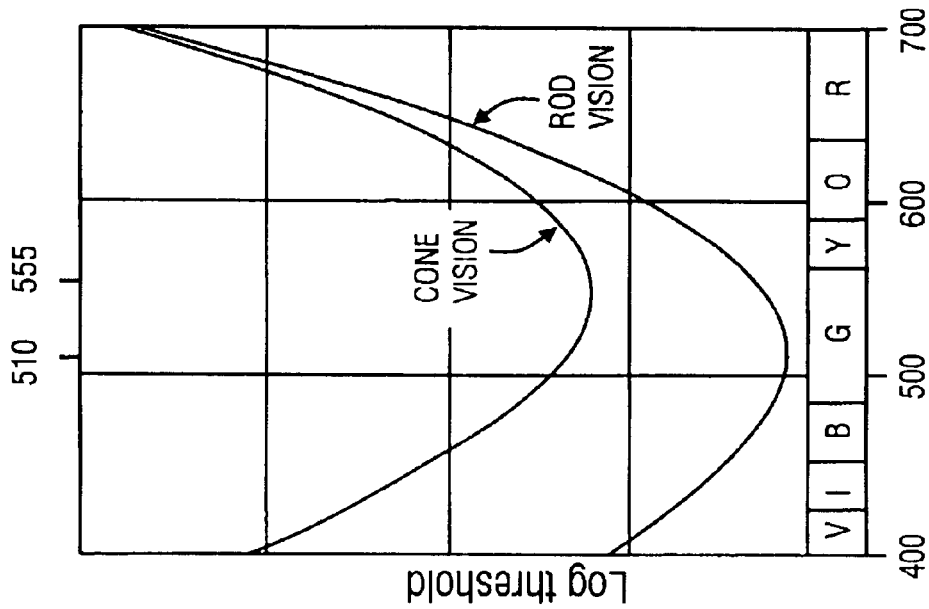
FIG. 3B is a graph of the threshold of rods and cones within the average human eye.
Figure 3A:
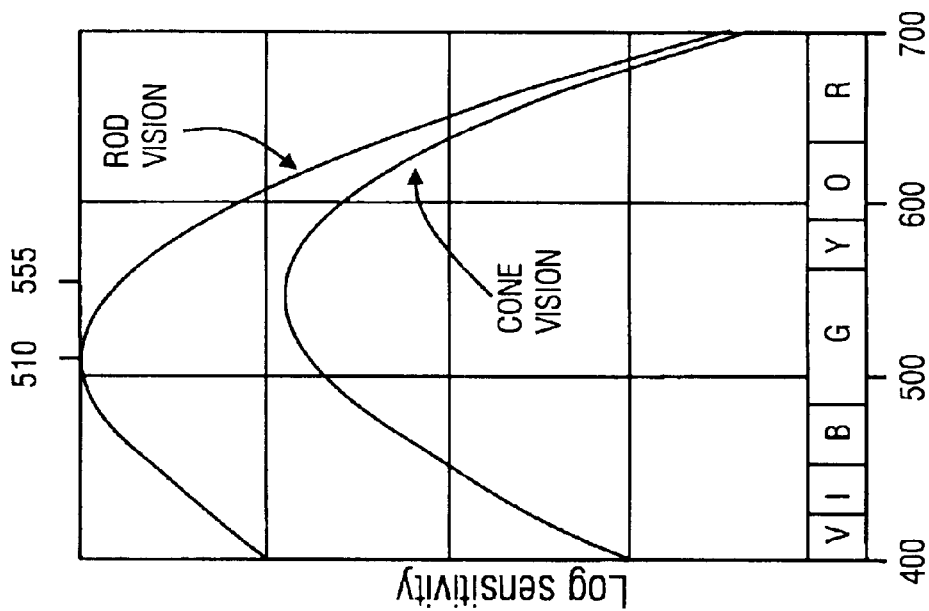
FIG. 3A a graph of the sensitivity of rods and coves within the average human eye.

FIG. 1 is a system diagram of a system incorporating the present invention. In order to compress a video data signal and re-create a high quality version of the video image captured, several different types of processing are employed. A light source 10 illuminates a video subject 16. The video image of video subject 16 is captured by video camera 20 which produces a video signal. The video signal will be assumed to be an RGB video stream for illustrative purposes; however, it is to be understood that the present invention could be applied to other video signal formats such as NTSC, PAL or SECAM, although the processing of such signals without first translating them into RGB format would be more complex. Typically, the video signal also includes audio information. The present invention is applicable to sensory stimulus signals such as video, audio, video containing audio, or other similar signals. The RGB video data stream is input to filter 30, which performs reverse eye/monitor response compensation, and color raking. The combined filtering is illustrated as generalized response plot 32 of the frequency response characteristics of filter 30. The frequency response includes a generally concave curve to compensate for the generally convex cone sensitivity curve of the human eye which is shown in FIG. 3A.

After the video signal has been filtered it is digitized by analog to digital (A/D) converter 40, and then passed to a video compression and encoder chip such as a commercially available MPEG encoder chip 50. MPEG encoder chips typically include an on-board digital signal processor (DSP) with a number of programmable functions.

Oversaturation is then performed at block 54. Oversaturation can also be thought of as color rounding or color mapping. In the oversaturation step, color values within the data stream are replaced by nearby color values in order to decrease the number of color values necessary within the color palette of the MPEG encoder. This increases the average saturation level of the video signal. The video data representing the video signal is then compressed. The compressed video signal can be stored for later playback, or can be transmitted immediately across a variety of transmission media including a computer network such as the Internet for playback on computer monitors or other display devices. Various aspects of the present invention are discussed below in greater detail.

Reverse Spectral Compensation

The reverse eye/monitor spectral response compensation aspect of the present invention will be discussed in detail first. By itself, the reverse spectral compensation produces a reproduced image having an improved appearance over a reproduced but uncompensated image; the compensation does not result directly in higher compression ratios. However, when used to process a video signal to which lossy compression such as MPEG encoding will be applied, an improvement in the image appearance can be used either to simply improve the appearance of the final reproduced image, or alternatively to obtain a final image having a given degree of faithfulness to the original image but with a higher compression ratio than would have been possible otherwise. The reverse spectral compensation aspect of the present invention can therefore be thought of as one technique for obtaining increased compression ratios.

The first step therefore is to apply a first analog filter to an incoming video data stream such as an analog red/green/blue (RGB) video data stream. The RGB video signal may be either of the sync-on-green type or may have a separate sync signal. The first analog filter has a frequency response characteristic that, as a first approximation, tends toward the threshold curve of the cones within the eye. The reason for such a filter follows.

Figure 2:
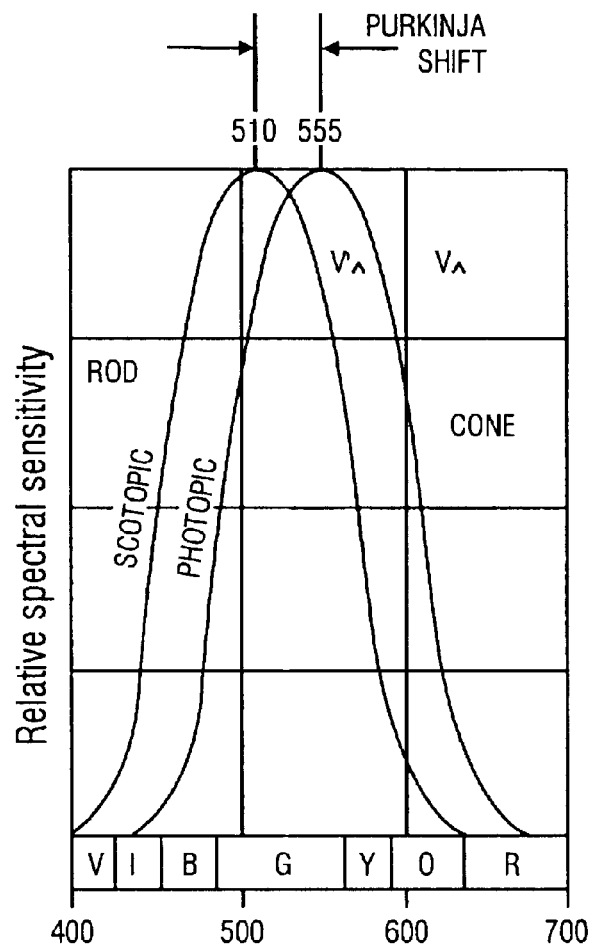
FIG. 2 is graph of the scotopic and photopic response of the average human eye.

The human eye has two types of light receptors: rods and cones. Rods are responsive to low levels of light, but are unable to distinguish between colors. Rods are responsible for what is called scotopic vision. The plot of relative sensitivity vs. wavelength for scotopic (dim light) conditions is shown in FIG. 2. At the scotopic light levels, only the rods are functioning. When only the rods are functioning, all wavelengths are seen as a series of lighter or darker grays. Weak light is visible, but hue is absent.

Cones, on the other hand are responsive to bright light, and distinguish between color hues. Cones are responsible for photopic vision. Photopic vision is the ability of the eye to perceive differences between color hues, i.e., to perceive thresholds between hues. Threshold can be thought of as the yes/no point of vision, that is, the point at which some critical detail just disappears, the "I see it/I don't see it" point of vision. The plot of relatively sensitivity vs. wavelength for photopic vision is also shown in FIG. 2. Mesopic vision occurs at intermediate levels of luminance, where rods and cones are believed to work together.

As the illumination level of intensity of a scene decreases, visual perception gradually shifts from photopic to scotopic as rods take over the job of seeing from the cones. Thus, as luminance decreases, so does the eye's ability to distinguish between the colors within a scene. If a given scene such as a daytime outdoor scene is recorded on a cinema film that accurately reproduces the colors within the original scene, but the scene is to be replayed on a reproduction device such as a television set whose intensity levels are lower than those in the original scene, the colors in the as-reproduced scene will appear depleted due to the gradual shifting from photopic to scotopic vision. People have grown accustomed to viewing television sets whose outputs are dimmer than the original scene and whose colors are therefore somewhat depleted due to the human eye's decreasing sensitivity to subtle color differences as luminance decreases. They therefore do not readily notice this depletion effect. However, it would be desirable to reduce, eliminate, or otherwise compensate for this depletion effect.

Increasing the intensities of colors within the portions of the spectrum where the cones are least sensitive, has the effect on the viewer of restoring to a significant extent the ability to perceive hues which would otherwise be lost due to depletion. The less sensitive the cones are to a particular frequency, the greater the intensity boost that is given to colors at that particular frequency.

FIG. 3A is a graph showing the sensitivity of the cones across the spectrum of visible light. FIG. 3B is a graph showing the threshold values necessary to activate the cones. By definition, FIG. 3A is the inverse of FIG. 3B.

FIG. 4 shows reverse spectral compensation for expected display devices having various luminance levels. The various curves shown therein are not necessarily drawn to relative scale. The cone threshold curve of FIG. 3B is redrawn as part of FIG. 4 for easy reference. If a display device were to be used that had the same luminance level as the original scene, there would be no need to compensate for color depletion, and the response curve of the first filter would be flat as shown by the flat line labeled $C_0$ in the figure.

For a display device which is very bright but nevertheless will reproduce the scene slightly darker than the original, the compensation curve will be close to flat, but will bend up slightly to tend toward the cone threshold curve. This slightly bent up curve is labeled $C_1$. At such a luminance level the viewer will be utilizing mesopic vision, and will perceive colors within the displayed device according to mesopic vision response. Note that the cone vision curve peaks in the green region at about 555 nm, and falls off on either side, with the threshold level being higher in the red region than in the violet region. Therefore, the filter response curve $C_1$ for the bright display device is lowest at 555 nm, with slightly higher gain in the violet region, and still higher gain in the red region. Accordingly, the filter will have a response curve such that the greendominated colors are emphasized the least, the blue-dominated colors more, and the red-dominated colors still more. As one skilled in the art of filter design will recognize, in most cases such a filter may be implemented as a passive filter having the least amount of attenuation in the red region and the greatest amount of attenuation at 555 nm. The passive filter may be followed by a fixed gain amplifier. Other possible ways of implementing such a filter are well known in the art.

Regardless of the construction details of the filter, as the playback device expected to be used gets darker and darker, the desired filter response curve bends up closer and closer to the cone threshold curve, as illustrated by curves $C_2$ and $C_3$, respectively. Eventually, if the display expected to be used as a playback device were so dark in its uncompensated state that separate hues within the scene would be just barely discernible, the compensating first filter would have a response curve approximately equal to that of the cone threshold curve. Such a curve would represent full compensation for the response of the cones at the limits of their sensitivity. In reality, the expected playback device will not be nearly that dark. As a consequence, the response curve of the actual first analog filter used will bend toward the cone threshold curve, but will be somewhere in between flat and the cone threshold curve, as for example between curves $C_1$ or $C_2$. Whether the compensation curve is bent slightly toward the cone threshold curve for a bright display, or bent further toward the cone threshold curve for a darker display, the filter applied has a response characteristic that bears a generally inverse relationship to color perception response within the human eye. How sharply the filter characteristics bend up toward the color perception response within the human eye, will depend upon the generalized expected response of the display device.

When the video signal is in RGB format, the reverse spectral compensation will be performed on the RGB signals. The voltage levels at any given instant on the separate red, green, and blue signal levels represent the mix of red, green, and blue light necessary to obtain the color which is to be painted on the screen. As an example of the reverse spectral compensation performed on RGB signals, suppose that voltages on the RGB signal lines range from 0 to 10 in arbitrary units with 10 being full intensity of the original scene, the color of the original scene represents 10,10,10, and the reproduction device is-expected to reproduce the scene with an intensity of 7,7,7. In order to compensate for color depletion the first filter would leave the green signal unchanged but would boost the red and blue values, with resulting actual display intensities of 8,7,8. The viewer would perceive the resulting display as having more or less the same color hues and distinctions as the original 10,10,10, scene, but just at a lower intensity value.

Figure 6:
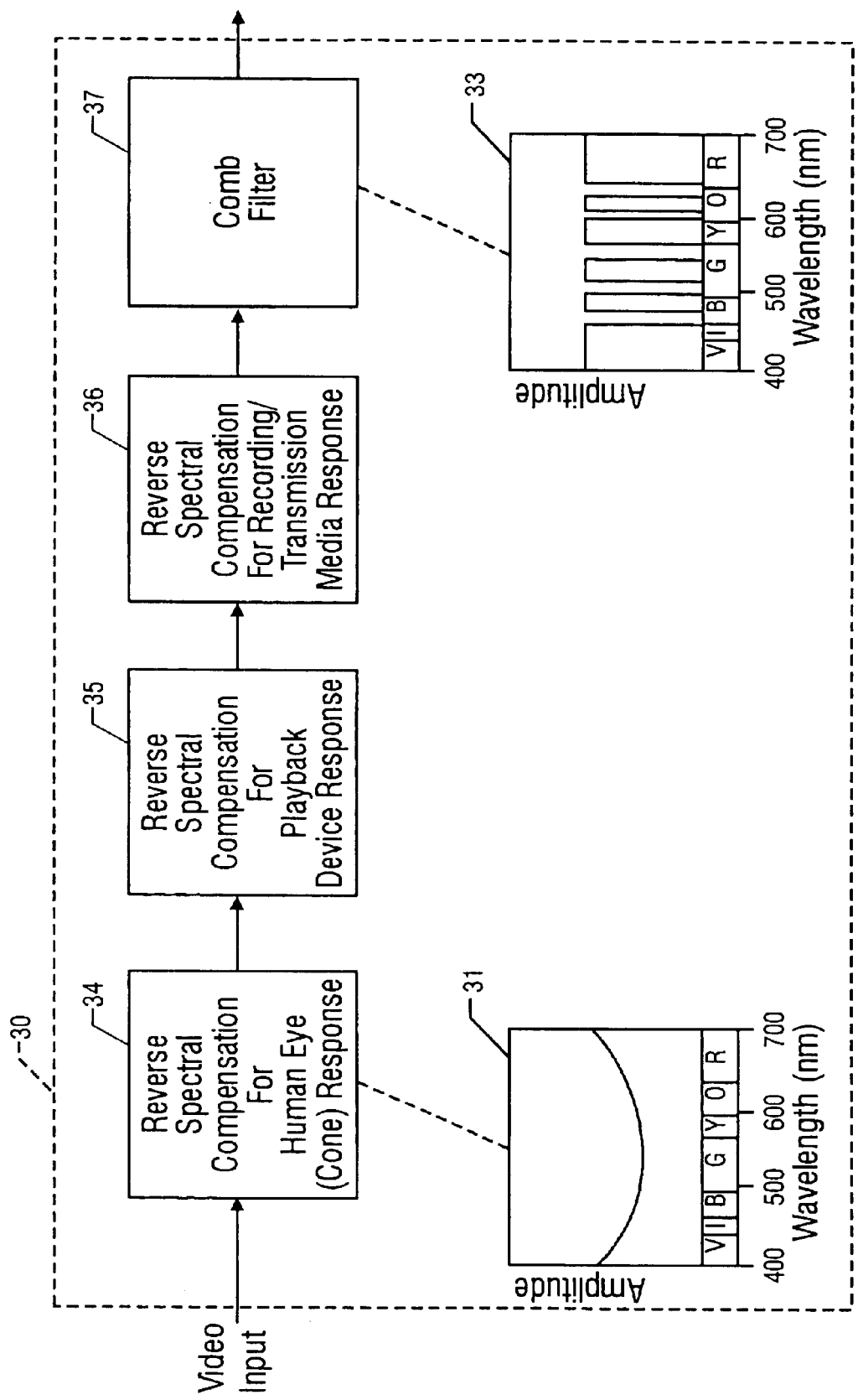
FIG. 6 is a block diagram showing in greater detail the construction of the reverse eye/monitor response compensation and raking block 30 from FIG. 1.

FIG. 6 shows a detail of reverse eye/monitor response compensation and raking Block 30. A reverse spectral compensation for human eye (cone) response filter 34 has response curve 31, which generally corresponds to the curve $C_2$ in FIG. 4 of a medium luminance display for illustrative purposes. Response curve 31 has a generally concave shape to compensate for the generally convex shape of the cone sensitivity curve in FIG. 3A. Comb filter 37 has response curve 33. Together, response curves 31 and 33 in FIG. 6 form response curve 32 in FIG. 1. Additional compensation 35 and 36 can be added to compensate for the spectral response of the expected playback device and the recording and/or transmission media response, respectively, as will be described.

In general, non-interlaced computer monitors have small dot pitches and are generally darker overall than television sets. Therefore, if a computer monitor is expected to be used as a playback device instead of a television set, then the response curve of the first analog filter will bend up farther toward the cone threshold curve than if the expected playback device were a television. Regardless of the particular type of playback device used, the reverse spectral response filtering will make the colors within a scene appear sharper, more alive, and more like the original scene. This is true regardless of whether the original scene is being broadcast live, was recorded on cinema film and then broadcast, or has been reproduced using other media and means.

One result of the foregoing is that if it is desired to make playback on a second device appear as if it were being played back on a first device, then the first analog filter can be designed so that the response represents the reverse of the human eye's response to the second device relative to the human eye's response to the first device. In this way, playback on one device can be made to appear more like playback on a second device.

Additionally, a second filter 35 therefore may compensate for the inherent output characteristics of an expected display device. The filter's response bears a generally inverse relationship to the expected display device's color response characteristics. For example, if the blue output of a particular liquid crystal display (LCD) display device on which the video signal is expected to be reproduced inherently is not a true blue and is also slightly darker than in the original video signal, the second filter 35 can both change the hues of the blue appropriately and can boost the blue component, by appropriate boosting and/or attenuating the red, green, and blue signals. In this way, the output of the LCD display will be made to look more true to the original signal, despite inherent chromatic inaccuracies in the display device. As one skilled in the art will recognize, this compensation technique is applicable to improve the appearance of any type of display whose output characteristics can be estimated or measured and generalized.

Figure 5:
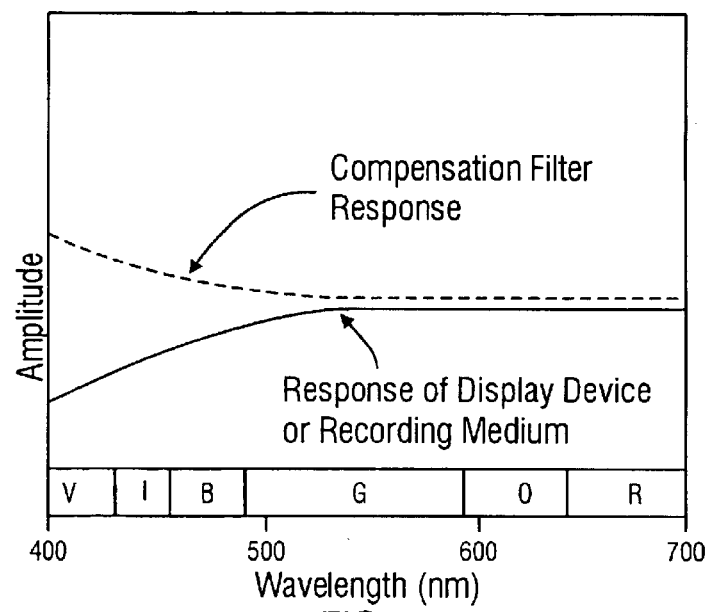
FIG. 5 is a graph showing reverse spectral compensation for a hypothetical display device or recording medium.

FIG. 5 illustrates a hypothetical example of compensating for the output characteristics of a display device. The solid line represents the response of a hypothetical display device in which the higher frequency blue output is weak relative to other colors. To compensate, a filter having the response curve shown by the dashed line is applied to the signal. The result is that the display will have an output whose spectral content closely matches the spectral content of the input video signal.

Alternatively, the second filter 35 can be designed to compensate for the inherent differences from one display device to the next. In this way, the output of second device can be made to look more like the output of a first device. For example, someone viewing a motion picture on a computer monitor may be most comfortable if the displayed motion picture looked more like it would if it were displayed on a familiar standard television set. Because of differences in the phosphor mixtures or other construction details between a television set and a computer monitor, the hues output from a monitor in response to a given video signal may not be identical to the hues output from a standard television set. By compensating for both the human's response to the dimmer monitor output, and for any inherent differences in the outputs between a television and a monitor, a computer monitor can be made to look more like a television set, thus producing a more pleasing and natural-looking appearance for the user.

As shown in FIG. 5, the same principle can be used to compensate for spectral response characteristics of other devices within the recording/reproduction chain, including the response of a recording medium such as videotape, or transmission medium. This compensation for the recording and/or transmission medium takes place in a third filter. This third filter 36 may therefore be added to compensate for the response of the recording and/or transmission media.

In sum, the first three filters 34, 35, and 36 compensate for both the cones' natural response to different light intensity levels, the inherent color output characteristics of an expected playback display device, and the expected color reproduction characteristics of a recording and/or transmission medium.

The foregoing is not intended to provide a rigid and inflexible formula for providing color compensation. Whether a particular mix of intensities, colors and hues on a display is optimal, is subjective and varies depending on the particular viewer, the type of scene being displayed, the ambient lighting in which the display will be viewed, whether one desires a relaxing or a vivid display, and other factors. Therefore, one may perform subjective evaluations of the resulting display, and make fine adjustments to the first, second, and/or third filters in order to arrive at a display that is subjectively optimal for any particular application. Whether or not such fine adjustments are made to the filter characteristics, according to the reverse compensation aspect of the present invention the signal is processed in a generally inverse relationship to a color perception response of a human eye according to sensitivities and cones within the eye, and/or in a generally inverse relationship to the expected response characteristics of the output device on which the video signal will be displayed, and/or transmission and/or recording media.

The reverse spectral response compensation can be incorporated either at front end processing of a video signal for later transmission to a display device, or may be incorporated within the display device itself, or may be incorporated at any point within the recording, transmitting, and playback process chain.

Reverse spectral response compensation filter described above may be advantageously used to improve the appearance of a display regardless of whether or not the video signal is to be compressed for transmission and/or storage, and decompressed for playback. Where a video signal is to be encoded using lossy compression such as the lossy compression described below, an appearance enhancing technique such as the reverse spectral response compensation described above can be used for one of two purposes. Either the compensation creates an improved appearance playback, or even more data can be allowed to be lost in the compression process thus creating even higher compression ratios while still obtaining an acceptably appearing playback, or some combination of these two. Thus, the reverse spectral response compensation technique described above is an advantageous addition to, though not a necessary part of, the remainder of the invention.

As will be apparent to one skilled in the art, the reverse spectral response compensation technique described has applications not only for video signals but for audio signals as well. The frequency response of the human ear varies with volume level, though to a lesser extent than does the response of the eye with illumination levels. Compensating for the frequency response of the human ear at the expected volume level at which the viewer/listener is expected to listen to the played back audio signal, can therefore be accomplished in a manner that is similar to the video spectral compensation described. If any audio shift is expected based upon the characteristics of the recording, transmission, and/or reproduction devices, the audio signal can be compensated accordingly.

Color Raking

A second type of filtering performed is "raking". The raking filter which forms a part of the present invention selectively and periodically "rakes" the spectrum to remove certain spectral values. The process of raking involves selectively removing a plurality of separate visible color value bands from the video signal in order to reduce the cardinal number of color values within the signal. The raking may be performed by comb filter 37 or a notch filter having a response which generally includes a plurality of separate stopbands as illustrated in response plot 33. Response plot 33 is shown having sharp cutoff regions for illustration's sake. The raking is performed primarily in the color regions in which the human eye's response to those colors is the strongest. In this region, the cones within the eye respond strongly to the color stimulus received, and is consequently discarding much of the received information. Thus, the raking can be performed without visible degradation of video quality. This raking is shown illustratively by the missing wavelength bands in response plot 32 of FIG. 1, as well as response plot 33 in FIG. 6. Since the visible light spectrum corresponds to the color pallet, removing portions of the spectrum translates to removing colors from the color pallet that is available to the system. If the raking is performed in narrow bands, the human eye does not perceive the missing color values. For example, a patch of color on a video screen normally will contain a range of wavelength values. If every fifth nanometer (nm) of wavelength is raked (i.e., wavelengths of 500 to 504 nm are left in the data stream but data of 505 nm is removed, 506 to 509 nm data are left in the data stream but 510 nm data is removed, etc.) from the image in the green-dominated color region in which the cone response is strongest, for most images the human eye will not be able to perceive that those narrow bands of colors have been raked out. The advantage to raking out color values from the spectrum and consequently removing color values from the color pallet, is that the video data compressor now has fewer possible color values which it must recognize, store, retrieve, and encode. This simplifies the job of the compressor, especially the motion vector calculator, thus increasing the throughput rate of the compressor. Additionally, by reducing the number of color values which the motion vector calculator must support, the number of motion vectors is greatly decreased. This greatly reduces the computational requirements of the compressor, the bit rate required in order to reproduce good quality MPEG video, and the computational requirements of the decompressor. It is believed that computational complexity and bit rate requirements bear a generally logarithmic relationship to the number of color values in the palette, and therefore even relatively small decreases in the number of color values in the palette result in dramatic decreases in compressor/decompressor computational load and bit rate requirements. It is believed that decreasing the number of colors in the color palette can actually increase the quality of an MPEG video stream. This is because decreasing the colors decreases the computation requirements. This allows the MPEG encoder to use some of its now-available computational throughput to calculate motion vectors which more accurately represent the video image being encoded, and encode those vectors into the 1.5 Mbit/s video stream according to the MPEG standard. It should be noted that advantages of raking may be realized in an MPEG encoder, a compressor which employs a look-up table (LUT) as part of its compression mechanism, as well as many other types of compressors. The rakings may be performed so as to rake out at least 5%, at least 10%, at least 20% or even more of the spectral content within the high response portion of the visible light spectrum. In the preferred embodiment, the raking of every fifth nm defines a 20% reduction in the removal of frequencies within that spectrum subset. In a sync-on-green system, it has been determined experimentally that adequate sync lock is obtained provided that at least approximately 65 percent of the information in the green signal is left unaffected by the raking.

Raking out every fifth nm in the high response area of the human eye has been found to produce good results when used in combination with an MPEG encoder. For an encoder with fewer color values in its color palette, the raking interval should be increased to avoid visible degradation in video quality. Conversely, for an encoder with a higher number of colors in its color palette, the raking interval could be decreased without causing visible degradation.

In the frequency response curve 32, various frequencies have been raked out as illustrated by the vertical raking lines. In an illustrative embodiment which has been shown to produce good results, the filter extends from 330–780 nm. In the mid range of the filter between the wavelength of 400 and 600 nm, every fifth nm of wavelength is removed. The 40 or so raking lines in the illustrative embodiment are not shown in FIG. 1; instead, for simplicity of illustration FIG. 1 shows only five raking lines in the wavelength response curve 32. The rakings may be accomplished by a series of notch filters or by a comb filter. Using presently available components, filter 30 is most practically implemented in analog hardware. The raking is advantageously implemented in the spectral band in which the human eye's color response is strongest and therefore in the bands in which the eye is less likely to perceive that slices of the band have been raked out. In the illustrative embodiment the raking is therefore performed in a predetermined color band in which the eye's color response is strongest, and no raking or less raking is performed in frequency bands in which the eye's color response is weakest. In the illustrative embodiment, the raking is performed at every fifth nm within the range of 400–600 nm, and is not performed outside of that region. In the preferred embodiment therefore, a greater percentage of colors is removed from the regions of 400–500 nm and 500–600 nm, than from the region above 600 nm; no colors are removed from the region of 650 nm. In general, for optimum performance the raking lines would be spaced closer together (or would be wider) within the frequency band of strongest cone response, and would be spaced progressively farther apart (or would be narrower) as one moved farther away from 555 nm and closer to the red and violet ends of the spectrum where the cone response is weakest. The actual filter chosen will be a tradeoff between design and manufacturing cost and complexity on the one hand versus performance on the other hand. Different design choices will be appropriate for different applications and environments.

Oversaturation

The next type of data substitution that is performed in order to increase the video data compression ratio, will be termed "oversaturation" or "color rounding." The oversaturation stage is performed within the MPEG encoder chip in the illustrative embodiment. In oversaturation, color values within the data stream are replaced by nearby color values in order to decrease the number of color values necessary within the pallet. A range of color values are all replaced by a single value, such that pre-defined spectral bands are mapped to corresponding replacement, or mapped, color values, to produced a mapped video signal. For example, all of the wavelengths within the range of 645 to 655 nm would be replaced with the value of 650 nm. The oversaturation process can therefore be considered color rounding, or mapping of colors to nearby color values. The point is to reduce the number of color values and thus reduce the number of colors within the color pallet that the compressor/encoder chip must deal with. Decreasing the number of colors in the color pallet increases the processing throughput rate and decreases the number of bits within the data stream necessary to reproduce a video image with a given level of precision, in much the same way that color raking does. Consequently, the bit rate of a compressed video data stream can be decreased while still maintaining high quality video reproduction. Although color rounding decreases the contrast of the video image, loss of contrast is generally less noticeable for moving pictures than for still pictures. When the color rounding is performed in the digital domain as in the illustrative embodiment, the rounding is performed with respect to binary boundary values such that certain binary values are replaced by other binary values. Those binary values do not necessarily correspond to integer wavelength values or integer wavelength intervals. However, integer wavelengths and integer intervals will be referred to herein for simplicity of discussion.

In the preferred embodiment, the color rounding is performed only in the higher portion of the spectrum. The spectrum portion is selected by the response of the eye to ,the computer monitor or other video reproduction device that will be employed. This helps to ensure that the video information which is lost by the data substitution process occurs in a spectral range in which the eye is least likely to perceive the loss of that data. In the preferred embodiment, the color value rounding is performed within the range of 500–750 nm at 10 nm rounding intervals. This results in a reduction by over fifty percent the color values within a spectral range of at least a 100 nm band, and a reduction of over twenty-five percent the number of possible color values within the entire spectral range of 390–750 nm. More specifically, it reduces the possible color values by approximately ninety percent within the region of 500–750 nm. Because the rounding is done above 500 nm, primarily all of the rounding or mapping is done with respect to wavelengths of 500 nm or greater.

The invention described above was implemented in a video storage and playback system. The invention allowed the number of color values within the color palette to be reduced from 65 million to 32 million possible color values. This allowed the data rate to be reduced from about 1 Mbit/s to 600 Kbit/s, while still maintaining high quality video reproduction.

Matching of Lighting Source

Additional reductions in compressed bandwidth can be obtained, either with or without other inventive elements previously described, by illuminating the video subject with a light source having a predetermined spectral band that is concentrated within a subset of the visible light spectrum, producing a video signal representative of the illuminated video subject, eliminating from the video signal color values which fall outside of the subset of the visible light spectrum, and then compressing the video signal using a compressor that substantially ignores color values that fall outside of that spectral subset. In the illustrative embodiment, light source 10 in FIG. 1 is a commercially available light source such as from the CINELAMP™ line of fluorescent lights available from Videssence, Inc., of Burlingame, Calif. Those lights include a tri-phosphor mix that produce primarily red, green, and blue emissions such that the spectral output exhibits peaks at the red, green, and blue frequencies and is highly concentrated in the interval of 390–690 nm. It is believed that the CINELAMP™ light were designed so that, even though its spectral content constitutes an abnormal lighting source, its distribution of power within that 390–690 nm spectrum is such that the human eye perceives the resulting illuminated image as being natural looking. The intended advantage was that illuminated subjects such as actors in a studio would not be overheated by receiving a full spectrum of both visible and invisible light, but would still be illuminated in a way that makes the illuminated and reproduced scene appear normal. A second advantage is that the spectral peaks are matched to the transducers within an RGB camera, thus reducing or eliminating the need for white balancing of cameras and/or post production color compensation.

The present invention takes advantage of this reduced spectrum and spectral peaks, by eliminating from the color palette those wavelengths that fall outside the nominal emission spectrum of the light. That is, the color values available to the processor need not include any color values outside of the range of 360–690 nm and outside the peaks. In normal studio conditions, there may be lights present other than the Videssence light, such as light bulbs in the distance which are not intended for illuminating the subject but are otherwise present in the studio. In such a case, there will still be some components of the received image which fall outside of the 390–690 nm range. The amplitudes of those components will be small and unintended. Unless those extraneous wavelengths are filtered out or the processor is otherwise instructed to ignore them, those components will still be processed by the encoder thus creating overhead for the encoder and transmission bandwidth made necessary by those components. Therefore, the color value parameters 56 stored in the MPEG encoder chip 50 instruct the encoder to ignore color values outside of the designated 360–690 nm range. That is, the MPEG chip will substantially not encode any color values which fall outside of the 360–690 spectral subset. This further reduces the number of color values with which the video compressor must work, thus further increasing the video compression ratio while still maintaining a high quality reproduced video image.

For compressing of audio data or the audio portion of video signals, the spectral filtering described above will be modified according to the well documented spectral response of human auditory receptors, rather than visual receptors. As with the video filtering, the audio filtering will be subject to some experimentation in order to achieve the best actual perceived quality of the audio playback signal. Although well suited for increasing the compression ratios of moving video images, the present invention is also applicable to compressing still video images.

If desired after the video signal has been compressed, it can be stored on any one of a number of known mass storage devices. Known video storage devices include both analog and digital video storage devices. The stored video signal can be retrieved later and played back, including played back for broadcast over various video delivery vehicles including a computer network. The invention can therefore be used to facilitate high quality broadcast of motion pictures, sporting events, or other live or pre-recorded content over computer networks including the Internet. If the user's connection is of a sufficiently high bandwidth, the broadcast can be a real-time broadcast.

It will be appreciated that the term "present invention" as used herein should not be construed to mean that only a single invention having a single essential element or group of elements is presented. Rather, each novel and nonobvious element constitutes a separate invention. Further, each novel and nonobvious combination of elements enabled by the present disclosure, whether the individual elements therein be old elements, new elements, or any combination thereof, further constitutes an additional separate invention.

Although the present invention has thus been described in detail with regard to the illustrative embodiments and drawings thereof, it should be apparent to those skilled in the art that various adaptations and modifications of the present invention may be accomplished without departing from the spirit and the scope of the invention. Different embodiments using currently available technologies and tools will be readily apparent to those skilled in the art, and even still further embodiments will be apparent to those skilled in the art as different technologies progress and improve. For example, although the color raking and eye perception compensation is performed using analog filters and the oversaturation is implemented digitally in the illustrative embodiment, it will be readily apparent that filtering can generally be performed using either analog or digital filters, depending on which type of filter happens to be most convenient and practical for a particular desired function. Filtering can also be performed using other well-known filtering techniques including switched capacitor filters. If the filtering is to be performed digitally, the filter may be implemented either using dedicated digital filters or using general purpose processors programmed to implement the digital filtering. Digital signal processors (DSP's) can also be used, either in the form of general purpose DSP chips or as DSP cores on chips having additional functionality such as MPEG encoder chips. The instructions and/or parameters necessary for programming a general purpose processor or dedicated digital filter are usually stored in computer readable memory including RAM, ROM, hard disks, tape, or other well known computer readable memories. Programming the instructions and/or parameters necessary to accomplish the digital filtering is within the skill of the ordinary software programmer and the ordinary digital filter designer. The implementation of a particular filter using particular hardware and using a particular technique is a matter of convenience, economy, commercial availability, design choice, and other well known design considerations.

Similarly, the compressor/encoder used need not be an MPEG encoder. The present invention may be used with any compression mechanism which will benefit from the removal from the incoming data so as to reduce the number of data values which must be stored, manipulated, and/or transmitted. Nor is it necessary that the signal be a video signal; the signal may be any signal whose compression ratio may be increased by the selective removal of information which will not noticeably degrade the accuracy of data reproduction. It will also be appreciated that in the data removal such as the data raking and data rounding illustrated herein, the exact parameters for the raking and rounding are somewhat arbitrary, and are subject to experimental determination of acceptable or optimal parameters given system performance requirements such as maximum data bit rate, computational throughput rate, image quality, and the like. For example, although the raking is described as being performed periodically, it is not necessary that the wavelength intervals between raking lines be consistent or that the raking lines have uniform width. Such variations are intended as being within the scope of the term "periodic". It is also to be understood that processing of the video signal can be performed either directly on the signal itself or on a reproduction of the actual signal, or the processing can be performed on any of various possible representations of the video signal such as a data stream or data file which represents a digitized version of the video signal or a version of the signal translated from one video format to another. As used in the claims therefore, various terms used to describe the processing of the video signal are intended to encompass such direct processing of the video signal itself, as well as processing of various possible representations of the video signal.

Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A method of producing and compressing a video signal, the method comprising the steps of:
    illuminating a video subject with a known lighting source having a predetermined spectral band concentrated within a subset of a visible light spectrum;
    recording said video subject to produce a video signal representative of said illuminated video subject;
    periodically in frequency eliminating color values from said video signal;
    substantially eliminating from said video signal color values which fall outside of said subset of the visible light spectrum; and
    compressing said video signal.

2. The method of claim 1 wherein said visible light subset consists essentially of colors having wavelengths within the region defined by 360–690 nm.

3. The method of claim 1 wherein said lighting source comprises a triphosphor fluorescent lamp, and said visible light spectrum comprises three discrete bands generally centered about red, green, and blue colors.

4. The method of claim 1 wherein said periodically eliminating step comprises:
    periodically removing color values from a predetermined high eye response band of said video signal in order to decrease possible color values numbers within said filtered video signal;
    replacing a first range of color values in said video signal with first replacement color values in order to decrease possible color value numbers within said video signal.

5. The method of claim 4 wherein said compression step comprises lossy MPEG compression.

6. A method of producing a compressed video signal comprising the steps of:
    illuminating a subject with a light source having a known spectral distribution, said spectral distribution being concentrated within a subset of the visible light spectrum;
    capturing said video image to produce a video signal;
    providing said video signal to a video compression processor;
    programming said video compression processor to substantially not encode color values which fall outside of said subset of the visible light spectrum.

7. The method of claim 6 wherein said visible light subset consists essentially of colors having wavelengths within the region defined by 360–690 nm.

8. The method of claim 6 wherein said video compressor processor is an MPEG encoder, and said programming step includes selecting appropriate color value parameters for encoding said video signal.

9. A video encoder for encoding video images, comprising:
    a processor; and
    a program to be used by said processor, said program including a plurality of color value parameters;
    wherein said color value parameters are determined in accordance with spectral output characteristics of a reduced spectrum lighting source.

10. The method of claim 9 wherein said processor is programmed to encode a color band consisting essentially of 360–690 nm.

11. The video encoder of claim 9 wherein said processor is an MPEG video processor, and said color value parameters include color wavelength values.

12. The video encoder of claim 9 wherein said color value parameters are chosen to provide substantial encoding for three bands of color centered about the red, green, and blue wavelengths, and to substantially not encode discrete bands of color between the red and green wavelengths, and between the green and blue wavelengths.

13. The video encoder of claim 12 wherein said color value parameters are further chosen to substantially not encode wavelengths below 390 nm, and to substantially not encode wavelengths above 690 nm.

* * * * *